Aug. 9, 1938.   J. J. HOPFIELD   2,125,922
METHOD OF CUTTING GLASS SHEETS
Filed Sept. 26, 1935   2 Sheets-Sheet 2
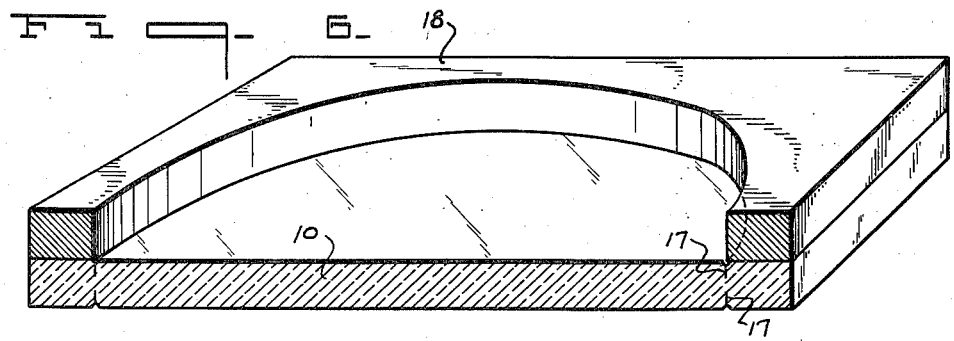
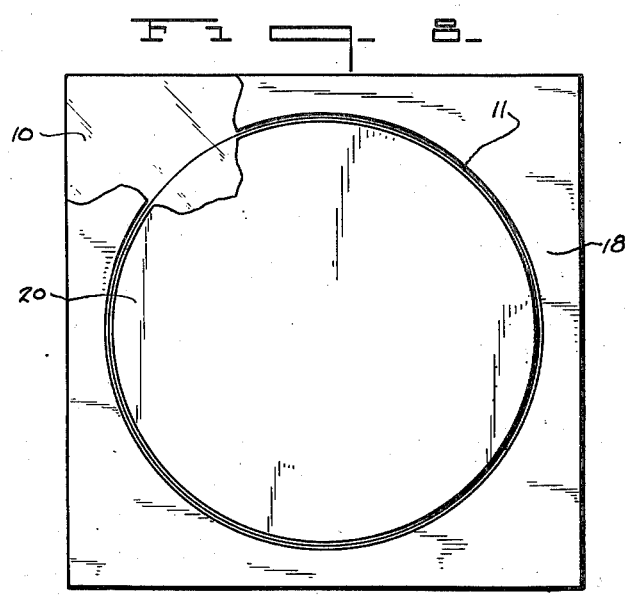
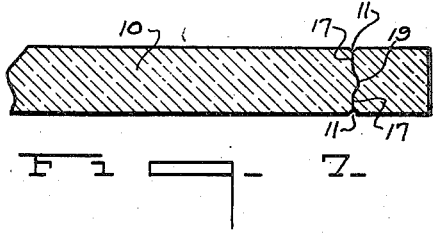
Inventor
JOHN J. HOPFIELD.
By Frank Fraser
Attorney Patented Aug. 9, 1938

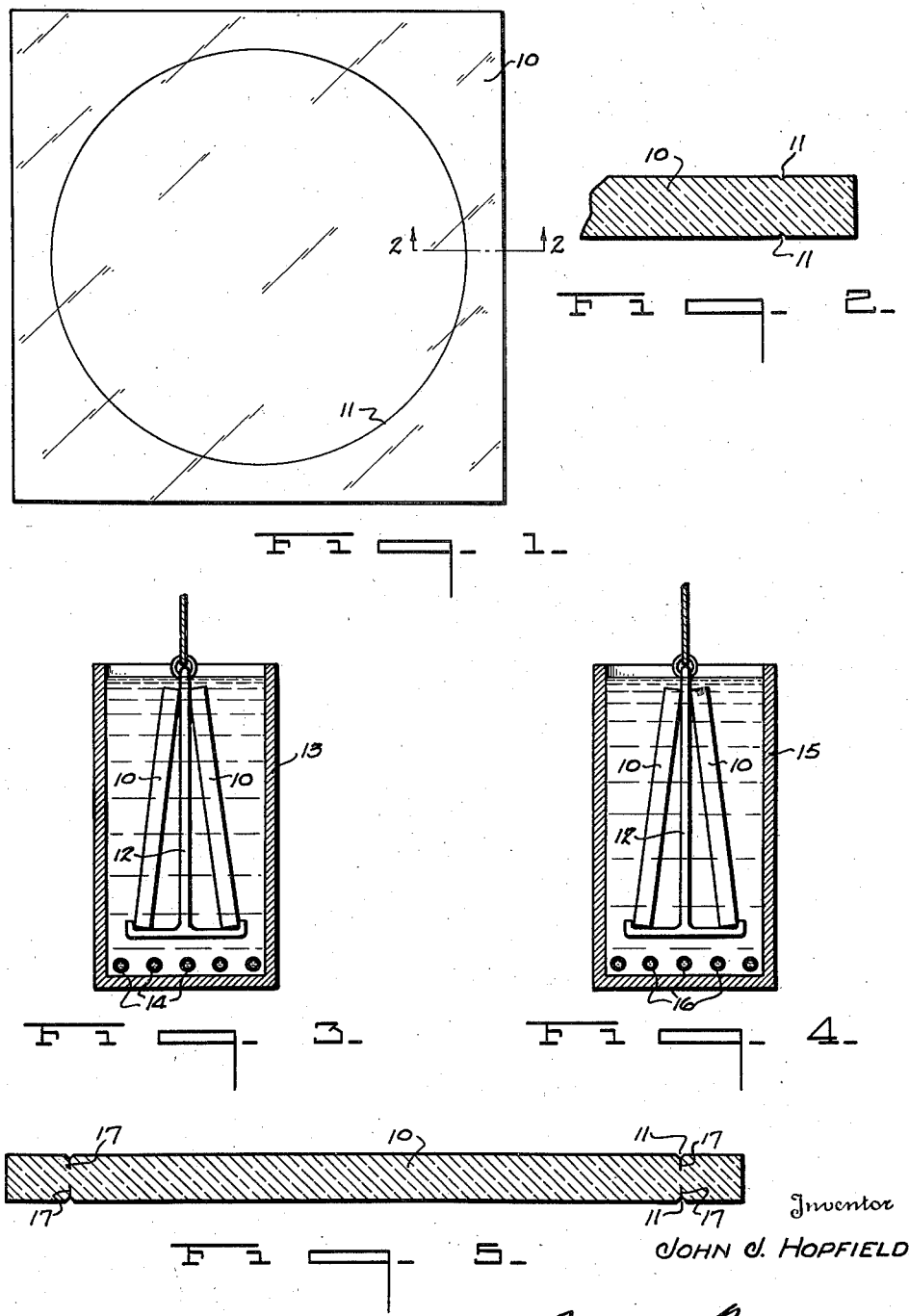

2,125,922

UNITED STATES PATENT OFFICE 2,125,922

METHOD OF CUTTING GLASS SHEETS

John J. Hopfield, Toledo, Ohio, assignor to Libbey-Owens-Ford Glass Company, Toledo, Ohio, a corporation of Ohio Application September 26, 1935, Serial No. 42,285

6 Claims. (Cl. 49—77)

The present invention relates broadly to the art of cutting glass and more particularly to an improved method for cutting glass sheets or plates.

It is an aim of the invention to provide a novel method for cutting out forms or shapes of various sizes and/or contours from glass sheets or plates and which is of particular utility in the cutting of sheets or plates of relatively great thickness.

Another important object of the invention is the provision of a novel method which, while particularly adapted for the cutting of irregular or special shapes from relatively thick sheets or plates of glass, may also be used for the making of straight cuts and for the severing of relatively thins sheets or plates of glass as well as any other substance that has breaking properties similar to glass.

Other objects and advantages of the invention will become more apparent during the course of the following description when taken in connection with the accompanying drawings.

In the drawings wherein like numerals are employed to designate like parts throughout the same, Fig. 1 is a plan view showing a sheet of glass from which a disc or circular section is to be cut, Fig. 2 is a sectional view taken substantially on line 2—2 of Fig. 1, Fig. 3 is a vertical sectional view of one type of apparatus which may be used for heating the glass sheets subsequent to scoring.

Fig. 4 is a similar view of apparatus which may be used for cooling the glass sheets after heating, Fig. 5 is a transverse sectional view through a sheet of glass showing the manner in which the said sheet automatically fractures upon being heated and then cooled.

Fig. 6 is a perspective sectional view showing one way in which the glass sheet may be further heated to effect the completion of the cut, Fig. 7 is a transverse sectional view of a portion of the glass sheet showing the way the cut appears when completed, Fig. 8 is a plan view of a modified arrangement which may be used for effecting the desired heating and cooling of the glass sheet, and Fig. 9 is a sectional view showing the manner in which a relatively thinner sheet of glass appears when scored only on one side.

The method of this invention is based on the principle of the differential expansion and contraction of glass upon alternate heating and cooling thereof. It relies upon the well-known properties of glass of expansion on heating and shrinking on cooling, upon its relatively small heat conductivity which allows large temperature gradients to be set up in the glass when it is heated or suddenly cooled, and upon its general fragile nature when made under ordinary conditions.

The improved method consists essentially in first scoring the glass sheet in the desired manner upon one or both surfaces thereof and in then suddenly chilling the scored surface or surfaces. This sudden chilling of the glass sets up a large temperature gradient in the direction of the normal to the surface, with the result that the surface of the glass is under tensional stress and fractures or cracks along the scored line, whether this line be straight or curved. In order to establish a sufficiently large temperature gradient in the glass sheet upon chilling thereof, it is preferred that the sheet be heated prior to the chilling operation. The sudden chilling of the sheet does not cause it to break completely through, but in cutting relatively thin sheets a sufficiently deep vent or fracture usually results so that in most cases it is a simple matter to complete the breaking operation by merely flexing the glass in the customary manner. When cutting relatively thick sheets, the vents or fractures formed in the glass upon chilling thereof also extend only partially through the sheet, and it is preferred that the sheet be further heated outwardly of the line of cut to complete the cutting operation.

Referring particularly to the drawings, the improved method herein provided will now be described, by way of example, as it is carried out in the cutting of a circular section or disc from a relatively thick sheet of plate glass. A glass plate blank of suitable size, indicated at 10 in Fig. 1, is first scored on both faces thereof with circles 11 directly opposite one another. The scoring of the sheet can be effected in any well known manner, using either a diamond or a rotatable steel wheel. The blank, after being scored, is adapted to be heated and to this end may be plunged into a bath of hot water and left until it is sufficiently heated. If desired, a number of properly scored blanks 10 may be carried by a rack 12 (Fig. 3) and submerged in a tank 13 filled with water and heated by any suitable heating means 14. When cutting a blank of three-fourths inch plate glass, a satisfactory immersion time in water at 80 to 90 degrees C. is about one and one-half minutes. The blanks are then removed from the hot water and suddenly chilled such as by plunging them into a bath of cold water. This can be done by simply lifting the rack 12 from the tank 13 and dipping it into a second tank 15 (Fig. 4) containing cold water which may be at room temperature or cooled by any suitable cooling means 16.

Upon being left in the bath of cold water for a relatively short length of time, relatively deep vents or fractures leading from the circular score lines 11 automatically occur in the glass blank as indicated at 17 in Fig. 5. This is due to the fact that the sudden chilling of the sheet sets up a large temperature gradient in the direction of the normal to the surface with the result that the surface of the glass is under tensional stress which causes the vents or fractures to automatically occur. It will be noted that the vents 17 do not extend entirely through the sheet but they may be sufficiently deep, depending upon the thickness of the sheet, so that the circular break may be completed by merely flexing the glass. However, when cutting relatively thick glass such as for instance a three-fourths inch plate, the sheet is preferably further heated outwardly of the score line to effect the completion of the cut. To this end, a hot plate 18, provided with a circular opening, may be placed concentrically upon the glass sheet as shown in Fig. 6.

The hot plate 18 is laid upon the glass sheet so that it encircles the vents 17 outwardly thereof and is preferably of such a size that it completely covers the sheet outwardly of the line of cut so that the rim of the glass will be uniformly heated. The heating of the glass sheet uniformly outwardly of the score lines is important in order that a clean break may be had and distortion of the circular section or disc prevented. The action of the hot plate expands the rim of the glass and thus causes it to automatically break completely away from the inner and colder circular section or disc as indicated at 19 (Fig. 7). If desired, during the heating of the sheet with the hot plate 18, the glass can also be flexed to assist the breaking thereof, although a flexing action is not always necessary.

It is customary, after scoring the glass sheet, to apply a suitable oil, such as kerosene oil or the like to the score lines, to keep the said scores open and prevent them from freezing before the sheet is subjected to the heating and cooling treatments.

Under certain conditions, the hot plate 18 can be supplemented with a cold disc 20 or its equivalent placed on the glass sheet inside of the hot plate and also inwardly of the score lines, as shown in Fig. 8. By using a cold disc in combination with the hot plate, a greater differential in temperature will be established at opposite sides of the vents 17. Furthermore, it may be desirable in some instances to use two hot plates at opposite sides of the sheet with or without cold discs. Also, in special cases it may be more effective to chill only one surface of the glass sheet to produce the vents rather than submerging the sheet in a bath of cold water. This may be accomplished by directing a stream of water against one surface of the sheet.

In the cutting of relatively thin glass sheets, it is not always necessary that the sheet be scored on both sides, but may be scored only on one side. For instance, in Fig. 9, there is shown a relatively thin sheet of glass 21 scored only on one side as at 22. Upon heating and subsequent cooling of the sheet in the manner outlined above, it will automatically crack along the score line 21 to produce the fracture or vent 23 which extends only partially through the sheet, and the cut can then be completed as indicated at 24 by simply snapping the glass or by using a hot plate, or by the combination of flexing and hot plate.

While it is not absolutely necessary in all cases that the glass be first heated before being chilled, such a method is preferred, especially with relatively thick glass, in order to establish a large temperature gradient in the glass when suddenly chilled. If, however, a liquid such as cold organic liquids or brines, or the freezing mixture of solid $CO_2$ and acetone be used to produce about the same difference from the room temperature as a difference between the hot and cold water, then the preliminary heating of the scored glass may be eliminated. It has been found that $CO_2$ and acetone works better for thinner glass, and must be used with care for glass one-quarter inch or more in thickness.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The method of cutting glass sheets, which consists in first mechanically scoring the sheet, then suddenly chilling the scored surface to cause the sheet to automatically fracture along the score line through a portion only of its thickness, and in then heating the glass sheet to one side only of the score line to complete the breaking operation.

2. The method of cutting glass sheets, which consists in first mechanically scoring the sheet, alternately heating and then suddenly chilling the scored surface to cause the sheet to automatically fracture along the score line through a portion only of its thickness, and in then heating the glass sheet to one side only of the score line to complete the breaking operation.

3. The method of cutting glass sheets, which consists in first mechanically scoring the sheet, then suddenly chilling the scored surface to cause the sheet to automatically fracture along the score line through a portion only of its thickness, and in then heating the glass sheet to one side of the score line while simultaneously cooling the glass at the opposite side of the score line to complete the breaking operation.

4. The method of cutting glass sheets, which consists in first mechanically scoring the sheet, alternately heating and then suddenly chilling the scored surface to cause the sheet to automatically fracture along the score line through a portion only of its thickness, and in then heating the glass sheet to one side of the score line while simultaneously cooling the glass at the opposite side of the score line to complete the breaking operation.

5. The method of cutting glass sheets, which consists in first mechanically scoring the sheet upon both sides thereof with the score lines directly opposite one another, suddenly cooling the sheet to cause the same to automatically fracture along the score lines through a portion only of its thickness, and in then placing a heated element upon the glass sheet outwardly only of the score lines to heat the glass and complete the breaking operation.

6. The method of cutting glass sheets, which consists in first mechanically scoring the sheet upon both sides thereof with the score lines directly opposite one another, alternately heating and then suddenly cooling the sheet to cause the same to automatically fracture along the score lines through a portion only of its thickness, and in then placing a heated element upon the glass sheet outwardly of the score lines and a cooling element upon the sheet inwardly of said score lines to effect the simultaneous and rapid heating and cooling of the glass at opposite sides of the said score lines to complete the breaking operation.

JOHN J. HOPFIELD.